United States Patent
Zhou et al.

(10) Patent No.: US 11,315,209 B2
(45) Date of Patent: Apr. 26, 2022

(54) IN-LINE AND OFFLINE STAGGERED BANDWIDTH EFFICIENT IMAGE SIGNAL PROCESSING

(71) Applicant: Black Sesame International Holding Limited, Santa Clara, CA (US)

(72) Inventors: Ying Zhou, Cupertino, CA (US); Zheng Qi, Cupertino, CA (US)

(73) Assignee: Black Sesame Technolgies Inc., San Jose, CA (US)

(*) Notice: Subject to any disclaimer, the term of this patent is extended or adjusted under 35 U.S.C. 154(b) by 0 days.

(21) Appl. No.: 16/869,964

(22) Filed: May 8, 2020

(65) Prior Publication Data

US 2021/0350498 A1 Nov. 11, 2021

(51) Int. Cl.
*G06F 15/80* (2006.01)
*G06T 1/20* (2006.01)
*G06F 13/16* (2006.01)
*G06T 1/60* (2006.01)
*G06T 15/00* (2011.01)

(52) U.S. Cl.
CPC ............ *G06T 1/20* (2013.01); *G06F 13/1605* (2013.01); *G06T 1/60* (2013.01); *G06T 15/005* (2013.01)

(58) Field of Classification Search
CPC ..................................... G06T 1/20; G06T 1/60
See application file for complete search history.

(56) References Cited

U.S. PATENT DOCUMENTS

| | | | | |
|---|---|---|---|---|
| 5,303,334 A * | 4/1994 | Snyder | .................... | G06T 17/00 358/1.9 |
| 2002/0180675 A1* | 12/2002 | Tobita | .................. | G09G 3/3233 345/87 |
| 2005/0091344 A1* | 4/2005 | Chen | .................... | H04L 67/1002 709/219 |
| 2006/0001768 A1* | 1/2006 | Koppe | ..................... | H04N 5/40 348/488 |
| 2006/0153234 A1* | 7/2006 | Iwamura | ............ | H04Q 11/0478 370/468 |
| 2009/0326966 A1* | 12/2009 | Callaghan | .......... | G06Q 30/0241 705/1.1 |
| 2011/0169841 A1* | 7/2011 | Bakalash | ................ | G06F 9/505 345/506 |
| 2015/0070530 A1* | 3/2015 | Tanaka | .................... | H04N 5/772 348/231.99 |
| 2016/0063760 A1* | 3/2016 | Woo | ....................... | G06T 15/005 345/423 |
| 2016/0119575 A1* | 4/2016 | Dabral | ............... | H04N 5/23232 348/362 |
| 2016/0182839 A1* | 6/2016 | Shigeta | ................ | H04N 5/2357 348/362 |
| 2020/0211166 A1* | 7/2020 | Yao | ......................... | G06T 5/009 |

* cited by examiner

*Primary Examiner* — Charles Tseng
(74) *Attorney, Agent, or Firm* — Timothy T. Wang; Ni, Wang & Massand, PLLC

(57) ABSTRACT

An example method of image signal processing, comprising at least one of, receiving a set of high priority signals, receiving a set of low priority signals, reconfiguring a first portion of a pipeline to route the high priority signals through an in-line mode process and reconfiguring a second portion of the pipeline to route the low priority signals through an offline mode process.

12 Claims, 12 Drawing Sheets

IN-LINE AND OFFLINE STAGGERED BANDWIDTH EFFICIENT IMAGE SIGNAL PROCESSING

BACKGROUND

Technical Field

The instant disclosure is related to image signal processing and specifically providing mixed in-line and offline staggered bandwidth efficient image signal processing.

Background

Currently, image signal processing processes data from multiple high-resolution cameras, the inputs may be at mixed resolutions, mixed frame rates and mixed exposures from mixed sensor array patterns. This mixture of products, resolutions rates, exposures and patterns necessitates a dedicated set of resources, which may or may not be utilized in any given period. This rigidity in resource allocation does not allow flexibility in signal processing and may be inefficient and slow.

What is sought is a flexible staggered data flow that allows the bus to be reconfigured on the fly and to take into account quality of service (QoS) concerns.

SUMMARY

An example method of image signal processing, comprising at least one of, receiving a set of high priority signals, receiving a set of low priority signals, reconfiguring a first portion of a pipeline to route the high priority signals through an in-line mode process and reconfiguring a second portion of the pipeline to route the low priority signals through an offline mode process.

An example system to process image signals, comprising at least one of, a quality of service module that receives image signals and decides upon a set of high priority signals and a set of low priority signals based on a set of quality of service constraints, an arbiter module coupled to the quality of service module, wherein the arbiter module, reconfigures a first portion of a pipeline to route the high priority signals through an in-line mode process and reconfigures a second portion of the pipeline to route the low priority signals through an offline mode process and a combiner module coupled to the arbiter module that combines the high priority signals and the low priority signals.

DETAILED DESCRIPTION OF THE INVENTION

The embodiments listed below are written only to illustrate the applications of this apparatus and method, not to limit the scope. The equivalent form of modifications towards this apparatus and method shall be categorized as within the scope the claims.

Certain terms are used throughout the following description and claims to refer to particular system components. As one skilled in the art will appreciate, different companies may refer to a component and/or method by different names. This document does not intend to distinguish between components and/or methods that differ in name but not in function.

In the following discussion and in the claims, the terms "including" and "comprising" are used in an open-ended fashion, and thus may be interpreted to mean "including, but not limited to . . . ." Also, the term "couple" or "couples" is intended to mean either an indirect or direct connection. Thus, if a first device couples to a second device that connection may be through a direct connection or through an indirect connection via other devices and connections.

Figure 1:
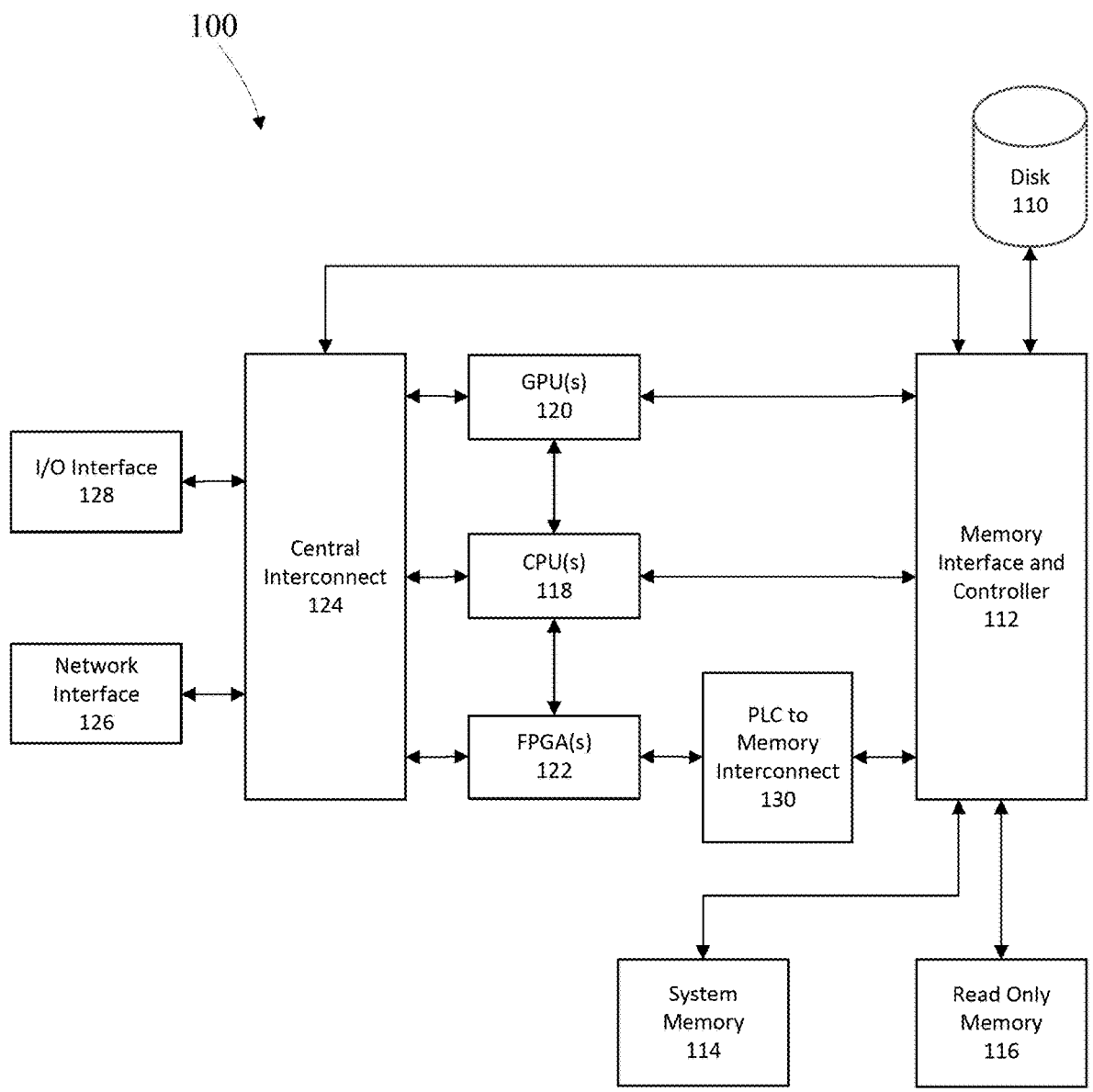
FIG. 1 is a first example system diagram in accordance with one embodiment of the disclosure.

FIG. 1 depicts an example hybrid computational system 100 that may be used to implement neural nets associated with the operation of one or more portions or steps of process 600. In this example, the processors associated with the hybrid system comprise a field programmable gate array (FPGA) 122, a graphical processor unit (GPU) 120 and a central processing unit (CPU) 118.

The CPU 118, GPU 120 and FPGA 122 have the capability of providing a neural net. A CPU is a general processor that may perform any different functions, its generality leads to the ability to perform multiple different tasks, however, its processing of multiple streams of data is limited and its function with respect to neural networks is limited. A GPU is a graphical processor which has many small processing cores capable of processing parallel tasks in sequence. An FPGA is a field programmable device, it has the ability to be reconfigured and perform in hardwired circuit fashion any function that may be programmed into a CPU or GPU. Since the programming of an FPGA is in circuit form, its speed is many times faster than a CPU and appreciably faster than a GPU.

There are other types of processors that the system may encompass such as an accelerated processing unit (APUs) which comprise a CPU with GPU elements on chip and digital signal processors (DSPs) which are designed for performing high speed numerical data processing. Application specific integrated circuits (ASICs) may also perform the hardwired functions of an FPGA; however, the lead time to design and produce an ASIC is on the order of quarters of a year, not the quick turn-around implementation that is available in programming an FPGA.

The graphical processor unit 120, central processing unit 118 and field programmable gate arrays 122 are connected and are connected to a memory interface controller 112. The FPGA is connected to the memory interface through a programmable logic circuit to memory interconnect 130. This additional device is utilized due to the fact that the FPGA is operating with a very large bandwidth and to minimize the circuitry utilized from the FPGA to perform memory tasks. The memory and interface controller 112 is additionally connected to persistent memory disk 110, system memory 114 and read only memory (ROM) 116.

The system of FIG. 1A may be utilized for programming and training the FPGA. The GPU functions well with unstructured data and may be utilized for training, once the data has been trained a deterministic inference model may be found and the CPU may program the FPGA with the model data determined by the GPU.

The memory interface and controller is connected to a central interconnect 124, the central interconnect is additionally connected to the GPU 120, CPU 118 and FPGA 122. The central interconnect 124 is additionally connected to the input and output interface 128 and the network interface 126.

Figure 2:
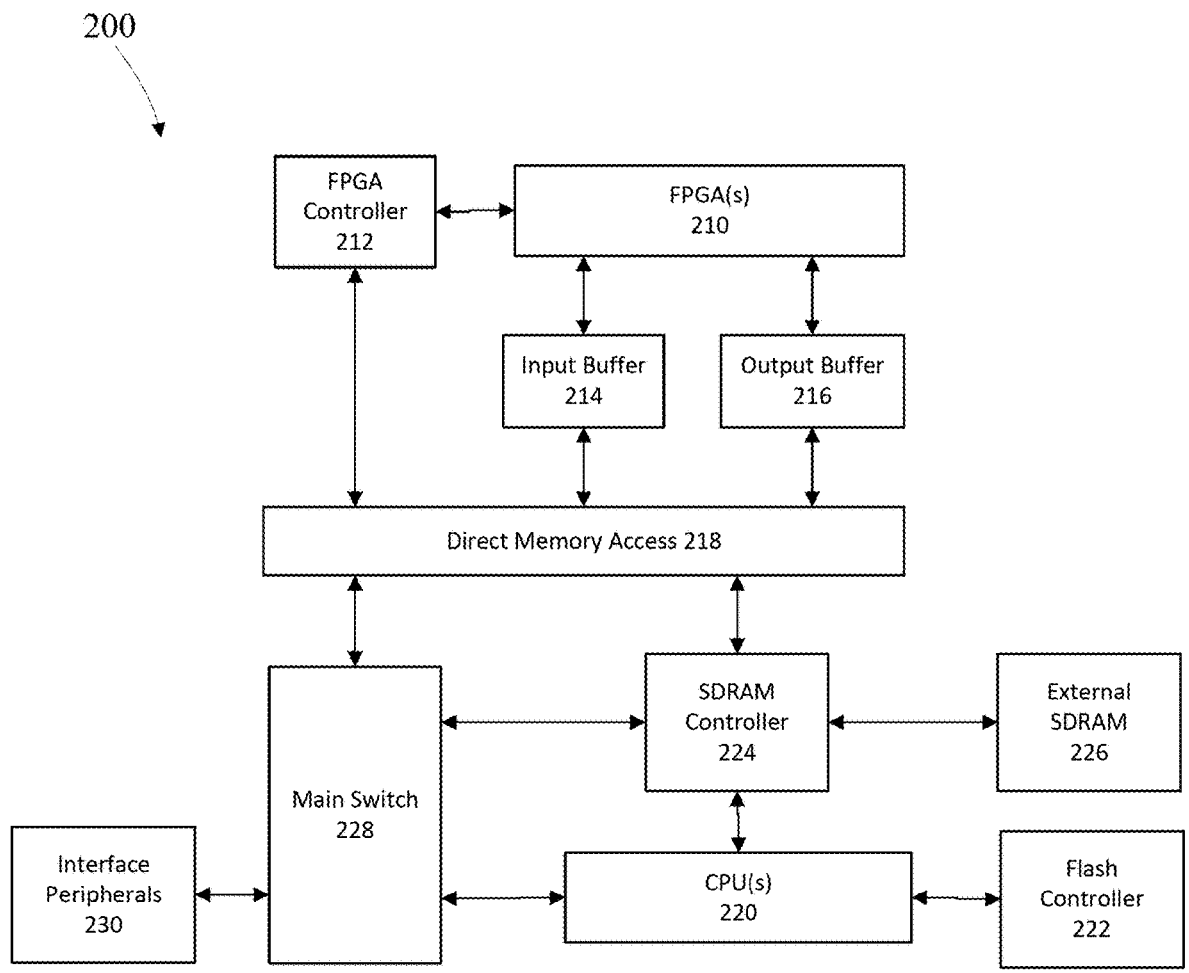
FIG. 2 is a second example system diagram in accordance with one embodiment of the disclosure.

FIG. 2 depicts a second example hybrid computational system 200 that may be used to implement neural nets associated with the operation of one or more portions or steps of process 1000. In this example, the processors associated with the hybrid system comprise a field programmable gate array (FPGA) 210 and a central processing unit (CPU) 220.

The FPGA is electrically connected to an FPGA controller 212 which interfaces with a direct memory access (DMA) 218. The DMA is connected to input buffer 214 and output buffer 216, which are coupled to the FPGA to buffer data into and out of the FPGA respectively. The DMA 218 includes of two first in first out (FIFO) buffers one for the host CPU and the other for the FPGA, the DMA allows data to be written to and read from the appropriate buffer.

On the CPU side of the DMA are a main switch 228 which shuttles data and commands to the DMA. The DMA is also connected to an SDRAM controller 224 which allow s data to be shuttled to and from the FPGA to the CPU 220, the SDRAM controller is also connected to external SDRAM 226 and the CPU 220. The main switch 228 is connected to the peripherals interface 230. A flash controller 222 controls persistent memory and is connected to the CPU 220.

The disclosed method and system supports multiple image signal processor pipelines to support both in-line and offline traffic and load balancing across image signal processor pipelines. The disclosed method allows flexible in-line, offline/hybrid mode partitioning and just-in-time combining of in-line and offline traffic. Memory traffic management of the image signal processor is based on quality of service constraints and memory bandwidth is reduced via intra-frame processing.

Currently, individual image signal processor pipelines support each sensor in a particular configuration; this type of implementation requires a large logic area. What is sought is to utilize an image signal processor pipeline to support multiple sensors.

Two modes will be utilized for the disclosed implementation, an offline mode that utilizes a frame by frame switch and an in-line mode that utilizes a line by line switch.

Figure 3:
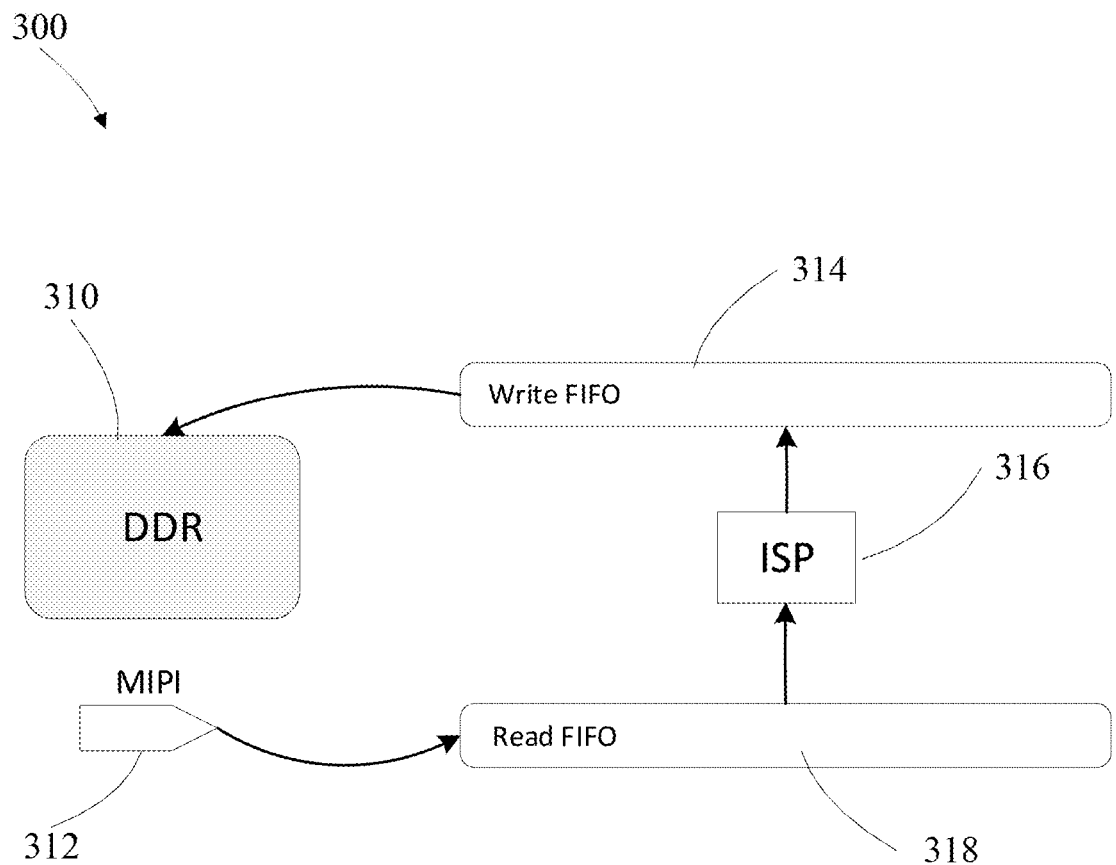
FIG. 3 is an example in-line mode system diagram in accordance with one embodiment of the disclosure.

FIG. 3 depicts an in-line mode system 300, in this system data arrives through a mobile industry processor interface (MIPI) 312 where the data is read first in first out 318 (FIFO) and the data is routed to an image signal processor (ISP) 316. After processing, the data is written to a write first in first out 314 (FIFO) and is sent to volatile memory 310, which in this case is a double data rate (DDR) which is a type of synchronous dynamic random access memory (SDRAM).

Figure 4:
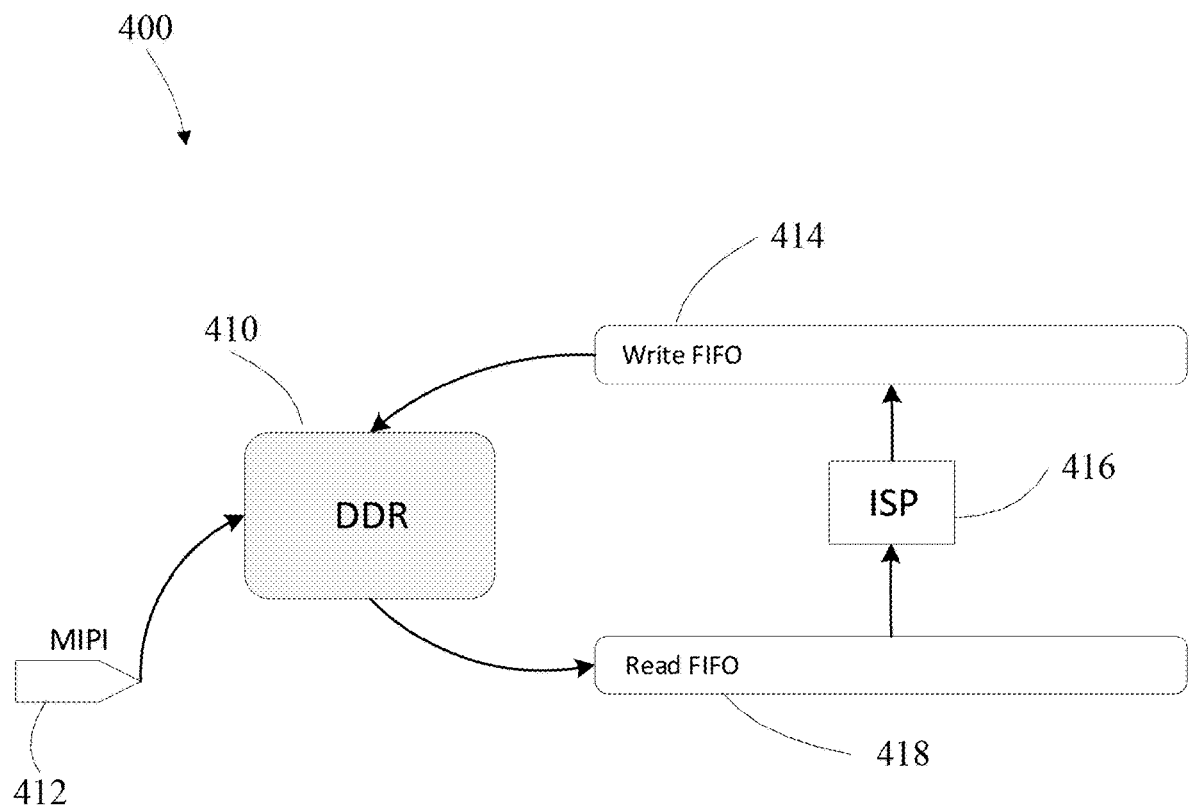
FIG. 4 is an example of mode system diagram in accordance with one embodiment of the disclosure.

FIG. 4 depicts an offline mode system 400, in this system the data arrives through a mobile industry processor interface (MIPI) 412 and is looted to volatile memory 410. The dynamic memory 410 sends the data to a read first in first out (FIFO) 418 and the data is routed to an image signal processor (ISP) 416. After processing the data is written to a write first in first out 414 (FIFO) and is sent to volatile memory 410.

Line-by-line switching allows individual image signal processor data pipelines to process multiple sensor inputs. Multiple sensor data input is routed to the individual image signal processor pipeline via a line-by-line to memory. In this way combinations of multiple sensor resolutions may be supported utilizing an efficient line-by-line buffer. The disclosed method supports combinations of large sensors and multiple different sensor resolutions in tandem. One image signal processor pipeline may support multiple varied sensors inputs a with a small logic area increase. The disclosed system implements a solution having less logic area than the alternate implementation of multiple image signal processor pipelines. The disclose line-by-line hybrid approach allows the support in-line and offline mixed streams.

Figure 5:
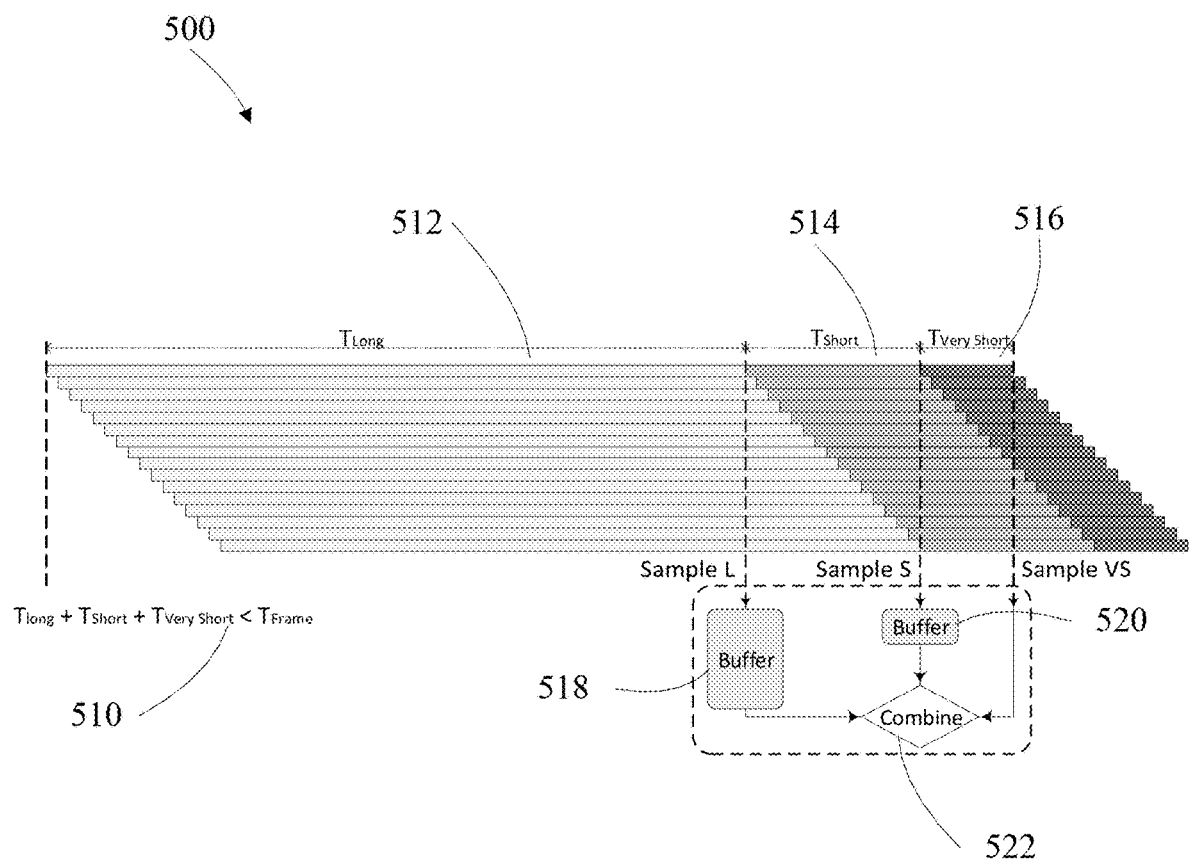
FIG. 5 is an example in-line mode timing diagram.

FIG. 5 depicts an in-line mode timing diagram 500. In this timing diagram the frame time 510 is less than the summation of the long duration exposures $T_{long}$ 512, the short duration exposures $T_{Short}$ 514 and the very short duration exposures $T_{VeryShort}$ 516. In this embodiment the various streams are routed to buffers 518, 520 and sent to the combiner module 522 for delivery of the data streams to the image signal processor.

The in-line mode utilizes less memory bandwidth than the offline mode and shorter latencies and fewer sensor lines. The offline mode saves design area, shares logic between multiple sensor processes and offers flexibility to support a wide variety of applications.

In an in-line mode design, the data flows from a buffer to the image signal processor. The in-line mode has reduced bandwidth, but utilized increased memory utilization to synchronize different exposure data.

In an offline mode design, the data flows from a volatile memory to a buffer to the image signal processor. The offline mode requires less buffer memory than the in-line mode to synchronize different exposure data, but utilizes a larger bandwidth to implement.

The disclosed image signal processing method and system utilizes an in-line and offline mixed mode and supports both in-line and offline staggered high dynamic range data. Long exposure data is routed from volatile memory to a buffer to the image signal processor and short exposure data is routed from a buffer directly to the image signal processor. The disclosed method utilizes less buffer memory, as compared to an in-line-only mode solution and utilizes less bandwidth as compared to an offline-only mode solution.

Figure 6:
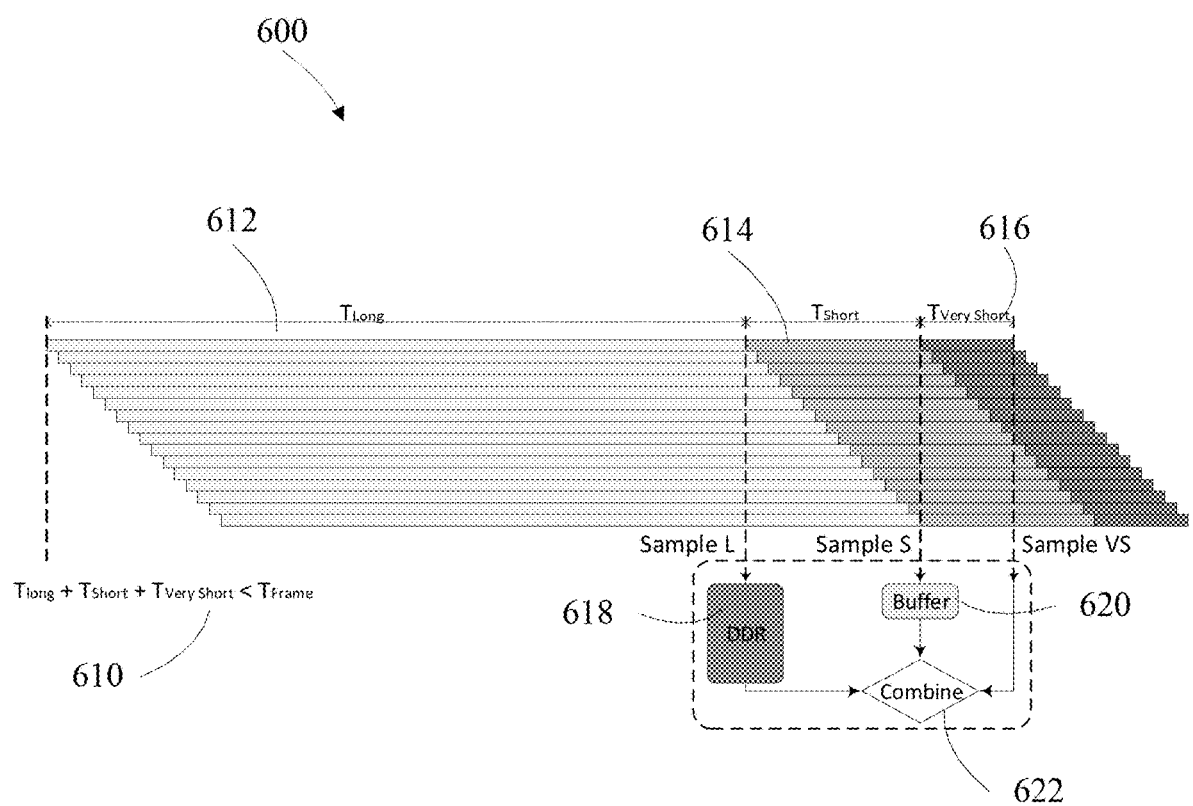
FIG. 6 is an example mixed mode timing diagram in accordance with one embodiment of the disclosure.

FIG. 6 depicts a combined mode system and frame 600. In this timing diagram the frame time 610 is less than the summation of the long duration exposures $T_{long}$ 612, the short duration exposures $T_{Short}$ 614 and the very short duration exposures $T_{VeryShort}$ 616. In this embodiment the short duration signals are sent to buffer 620 and the long duration exposure signals are sent to volatile memory 618 and to a buffer (not shown) which are subsequently sent along with the short duration signals and the very short duration signals to the combiner module 622 for delivery of the data streams to the image signal processor.

Mixed streams from sensors and memory are routable by the disclosed system. The disclosed system provides flexibility for different applications, a balanced loading for different image signal processor pipelines, a balanced design area, a balanced bandwidth and minimized image signal processor delay. Streams front the memory may have lower priority so the system can process real time traffic when the available bandwidth is inadequate for immediate needs. The image signal processor has the ability to delay reading data front the volatile memory and reallocate bandwidth to process urgent real time requests and when bandwidth is available, data reading is resumed.

The disclosed system provides for multiple qualities of service levels to balance urgent real-time, non-urgent real-time and best effort transactions. One embodiment prioritizes urgent real-time traffic over micro-controller requests, micro-controller requests over non-urgent real-time traffic and non-urgent real-time traffic over best effort traffic. An example embodiment levels up or levels down the quality of service for users.

Figure 7:
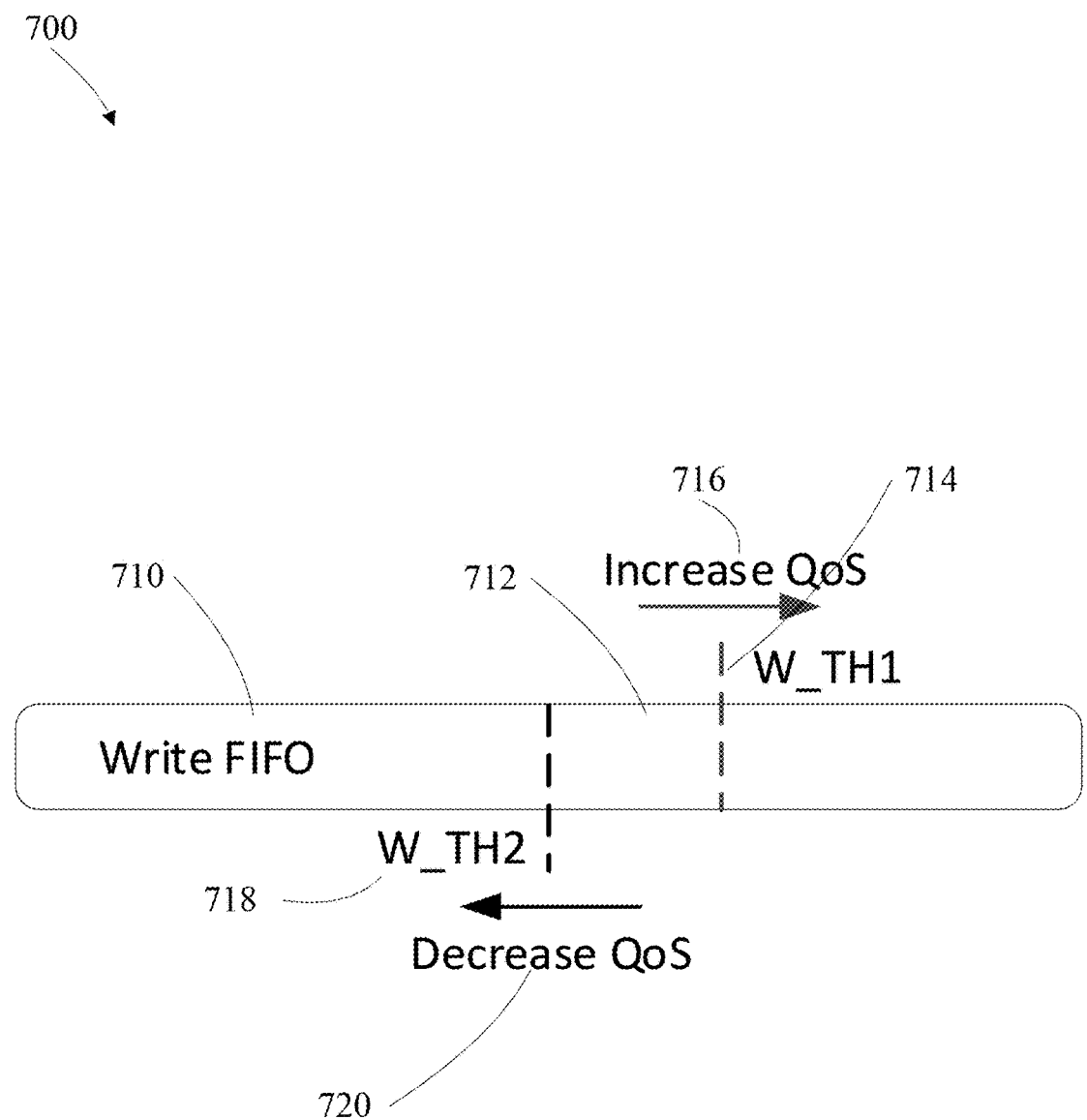
FIG. 7 is an example write mode QoS balancing in accordance with one embodiment of the disclosure.

FIG. 7 depicts a write FIFO 710 where increasing the quality of service 716 results in a longer write time W_TH1 714 and a decrease in the quality of service 720 results in a shorter write time W_TH2 718.

Figure 8:
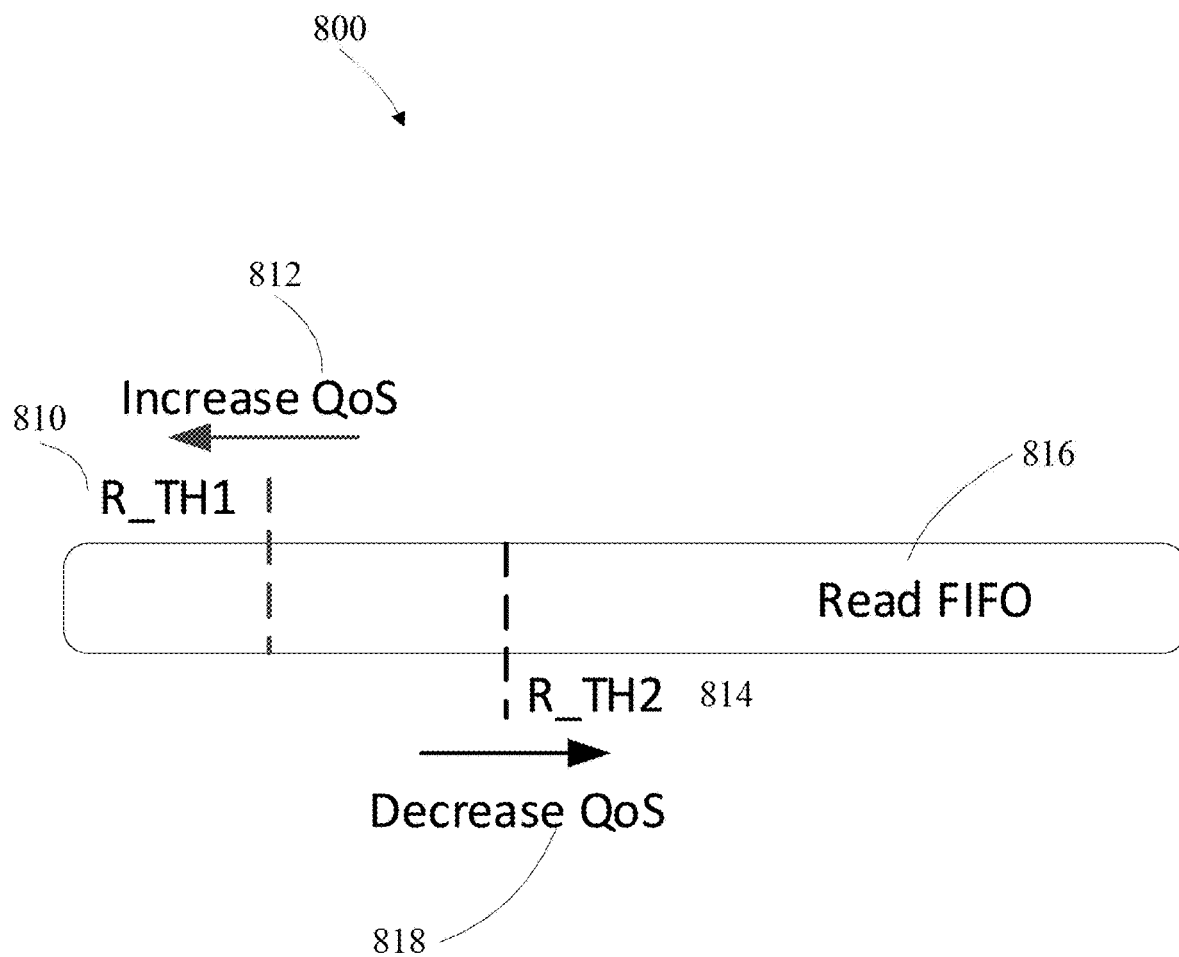
FIG. 8 is an example read mode QoS balancing in accordance with one embodiment of the disclosure.

FIG. 8 depicts a read FIFO 816 where increasing the quality of service 812 results in a shorter read time R_TH1 810 and a decrease in the quality of service 818 results in a longer read time R_TH2 814.

In one embodiment, a hurry sideband signal resolves low priority transactions blocking high priority transactions. The hurry side band signal informs an arbiter that high priority transactions are blocked so that the arbiter may process the blocking low priority transactions to resolve the issue.

One embodiment of an intra-frame process is disclosed in which a sensor raster input pattern and image signal processor two dimensional filters requests two input lines at a time. The method stores sufficient data so that the image signal processor processes two lines at a time. The disclosed intra-frame process reduces by half the line buffer data reading, thus reducing image signal processor filter buffer. Memory bandwidth and buffer memory reading power.

Figure 9:
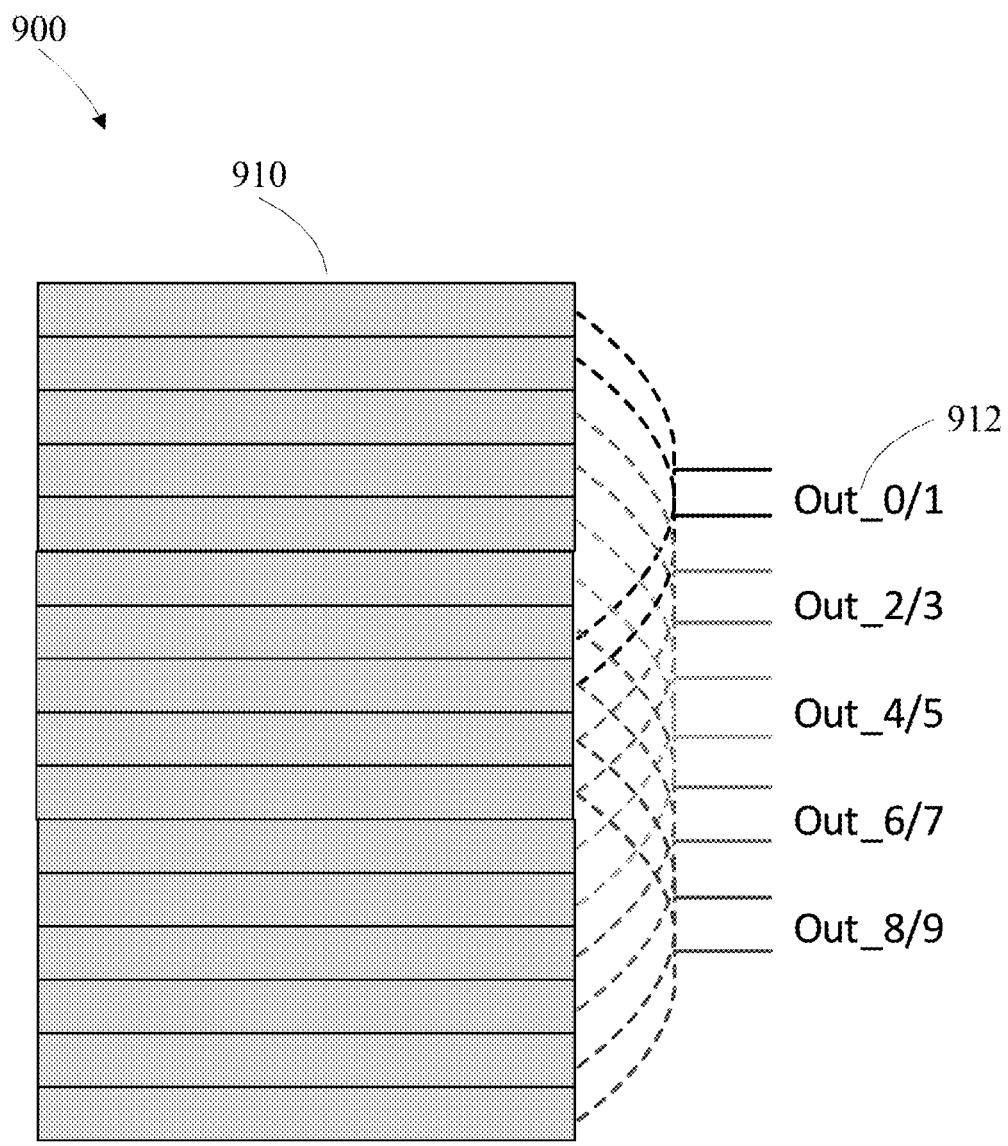
FIG. 9 is an example intra-frame process in accordance with one embodiment of the disclosure.

FIG. 9 depicts the intra-frame process 900 in which the data 910 is requested two lines at a time 912 so that the image signal processor may process the request two lines at a time. In this process two addresses are requested at a time with twice the pitch size.

In one embodiment vertical two lines processing includes comparing the pixels in two vertical lines in one clock cycle. Processing two lutes vertically in one clock cycle would have the same logic cost and process capability while saving local line buffer bandwidth.

In this embodiment a sensor raster input pattern and image signal processors perform two dimensional filtering, requesting two lines of input simultaneously. The solution stores sufficient data so that the image signal processor can process the two lines simultaneously. The AXI master is configured to support two writing addresses with twice the pitch size. Currently, a 7×7 image filter requires six lines of buffer to process a VGA image. The proposed solution could save half of the line buffer data reading, thus reducing, the image signal processor filter SRAM bandwidth and SRAM reading power.

Figure 10:
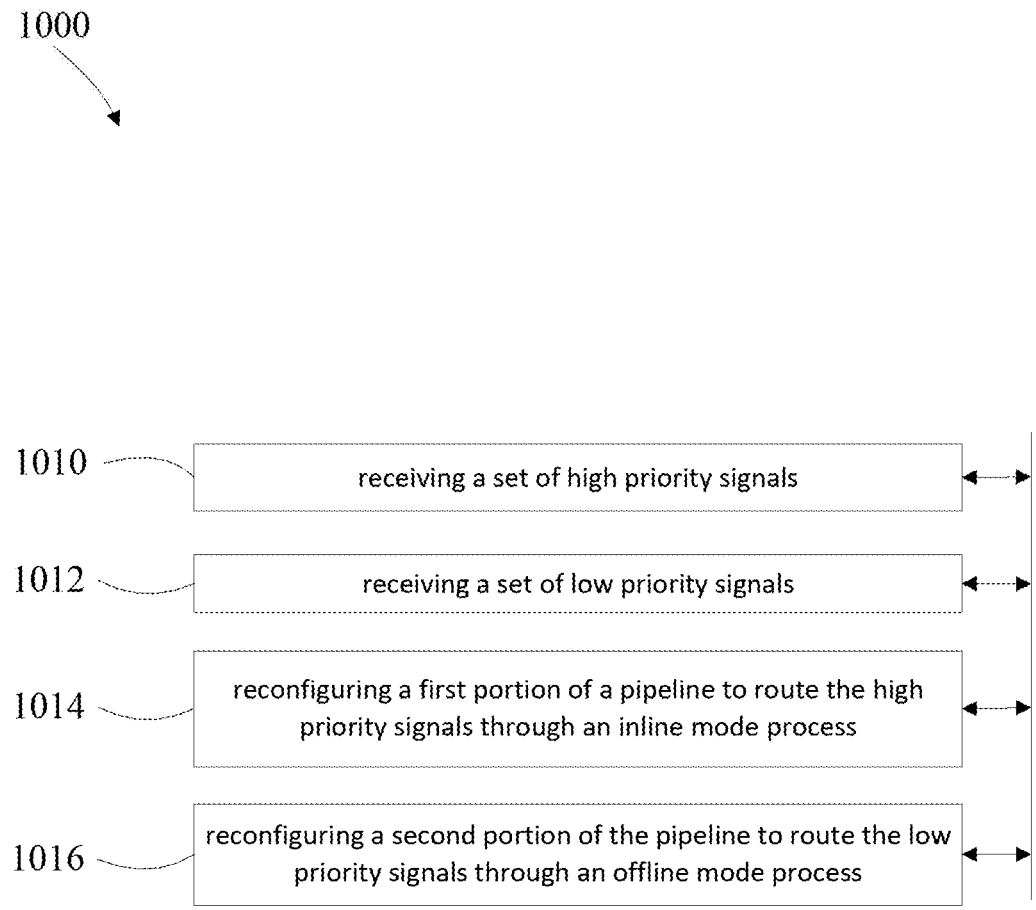
FIG. 10 is an example method in accordance with one embodiment of the disclosure.

FIG. 10 depicts a method of image signal processing, comprising, receiving 1010 a set of high priority signals, receiving 1012 a set of low priority signals, reconfiguring 1014 a first portion of a pipeline to route the high priority signals through an inline mode process and reconfiguring 1016 a second portion of the pipeline to route the low priority signals through an offline mode process.

The in-line mode provides buffering of the high priority signals to an image signal processor and the offline mode provides the storing of low priority signals in a volatile memory and provides buffering of the low priority signals to an image signal processor, additionally, the in-line modes and offline modes may be staggered.

The quality of service constraints balances urgent real time requests, non-urgent real time request and best effort requests. The long exposure images are processed in the offline mode and short exposure images are process in the in-line mode, and the pipeline is load balanced.

The method may include determining the reconfiguration of the first portion and the reconfiguration of the second portion based on quality of service constraints and combining the high priority signals and the low priority signals into the pipeline.

Figure 11:
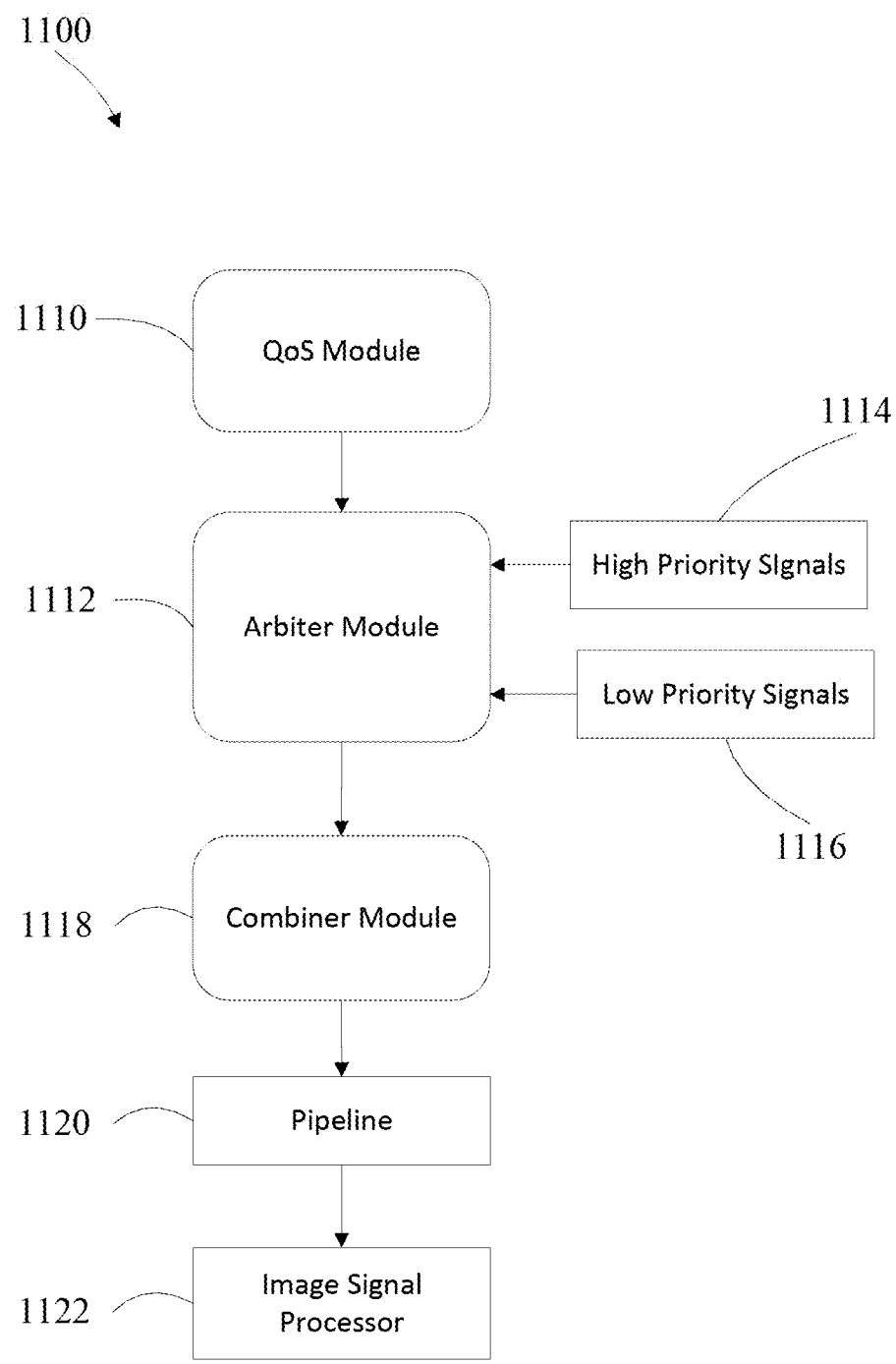
FIG. 11 is an example system in accordance with one embodiment of the disclosure.

FIG. 11 depicts a system 1100 to process image signals, including a quality of service to module 1110 that receives image signals and decides upon a set of high priority signals and a set of low priority signals based on a set of quality of service constraints. The system includes an arbiter module 1112 that is coupled to the quality of service module 1110, the arbiter module, reconfigures a first portion of a pipeline to route the high priority signals 1114 through an in-line mode process and reconfigures a second portion of the pipeline to route the low priority signals 1116 through an offline mode process. The system includes a combiner module 1118 coupled to the arbiter module 1112 that combines the high priority signals and the low priority signals in the pipeline 1120 to route the combined signals to an image signal processor 1122.

Figure 12:
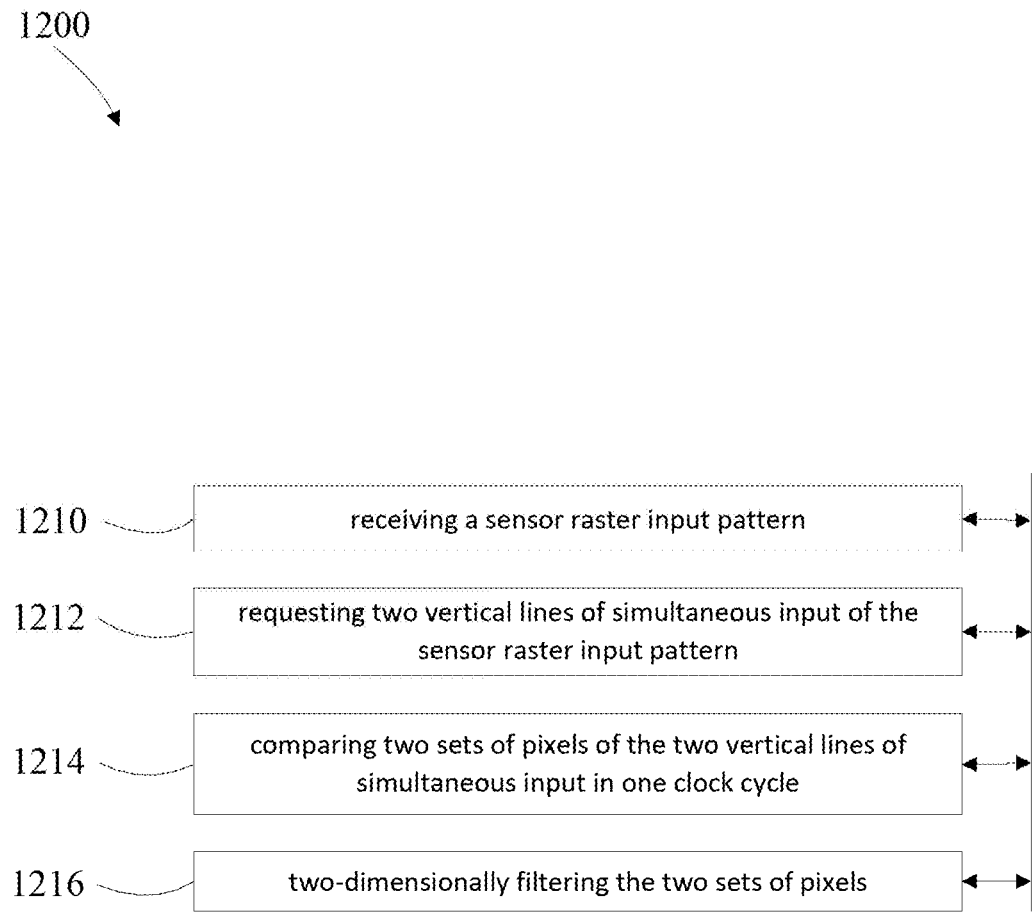
FIG. 12 is an example method in accordance with one embodiment of the disclosure.

FIG. 12 depicts an example method 1200 of image signal processing, comprising, receiving 1210 a sensor raster input pattern, requesting 1212 two vertical lines of simultaneous input of the sensor raster input pattern, comparing 1214 two sets of pixels of the two vertical lines of simultaneous input in one clock cycle and two-dimensionally filtering 1216 the two sets of pixels.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that the specific order or hierarchy of steps in the processes disclosed is an illustration of example approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention. The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code may be construed as a processor programmed to execute code or operable to execute code.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such as an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such as a "configuration" may refer to one or more configurations and vice versa.

The word "example" is used herein to mean "serving as an example or illustration." Any aspect or design described herein as "example" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

References to "one embodiment," "an embodiment," "some embodiments," "various embodiments", or the like indicate that a particular element or characteristic is included in at least one embodiment of the invention. Although the phrases may appear in various places, the phrases do not necessarily refer to the same embodiment. In conjunction with the present disclosure, those skilled in the art will be able to design and incorporate any one of the variety of mechanisms suitable for accomplishing the above described functionalities.

It is to be understood that the disclosure teaches just one example of the illustrative embodiment and that many variations of the invention can easily be devised by those skilled in the art after reading this disclosure and that the scope of then present invention is to be determined by the following claims.

What is claimed is:

1. A method of image signal processing, comprising:
   receiving a set of high priority signals;
   receiving a set of low priority signals;
   reconfiguring at a higher quality of service a first portion of a pipeline to route the set of high priority signals through an in-line mode process that utilizes a line by line switch received from a plurality of sensor inputs;
   reconfiguring at a lower qualify of service a second portion of the pipeline to route the set of low priority signals through an offline mode process that utilizes a frame by frame switch;
   determining, the reconfiguring of the first portion and the reconfiguring of the second portion based on quality of service constraints, wherein the quality of service constraints balances urgent real time requests, non-urgent real time requests and best effort requests and prioritizes urgent real time traffic over micro-controller requests, the micro-controller requests over non-urgent real time traffic and the non-urgent real-time traffic over best effort traffic; and
   staggering the in-line mode process and the offline mode process based on the quality of service constraints to enable real time reconfiguring at the higher quality of service and real time reconfiguring at the lower quality of service.

2. The method of claim 1, wherein the in-line mode process provides buffering of the set of high priority signals to an image signal processor.

3. The method of claim 1, wherein the offline mode process provides storing the set of low priority signals in a volatile memory and provides buffering of the set of low priority signals to an image signal processor.

4. The method of claim 1, further comprising combining the set of high priority signals and the set of low priority signals into the pipeline.

5. The method of claim 4, wherein at least one of long exposure high dynamic range images are processed in the offline mode process and short exposure images are processed in the in-line mode process.

6. The method of claim 5, wherein the pipeline is balanced.

7. A system to process image signals, comprising:
   a quality of service module that receives image signals and decides upon a set of high priority signals and a set of low priority signals based on a set of quality of service constraints, wherein the set of quality of service constraints balances urgent real time requests, non-urgent real time requests and best effort requests;
   an arbiter module coupled to the quality of service module, wherein the arbiter module;

reconfigures at a higher quality of service a first portion of a pipeline to route the set of high priority signals through an in-line mode process that utilizes a line by line switch received from a plurality of sensor inputs;

reconfigures at a lower quality of service a second portion of the pipeline to route the set of low priority signals through an offline mode process that utilizes a frame by frame switch; and a combiner module coupled to the arbiter module that combines the set of high priority signals and the set of low priority signals and prioritizes urgent real time traffic over micro-controller requests, the micro-controller requests over non-urgent real time traffic and the non-urgent real-time traffic over best effort traffic and the in-line mode process and the offline mode process are staggered based on the set of quality of service constraints to enable real time reconfiguration at the higher quality of service and real time reconfiguration at the lower quality of service.

8. The system of claim 7, wherein the in-line mode process buffers the set of high priority signals to an image signal processor.

9. The system of claim 7, wherein the offline mode process stores the set of low priority signals in a volatile memory and buffers the set of low priority signals to an image signal processor.

10. The system of claim 7, wherein long exposure high dynamic range images are processed in the offline mode process.

11. The system of claim 10, wherein short exposure images are processed in the in-line mode process.

12. The system of claim 11, wherein the pipeline is load balanced.

* * * * *